United States Patent
Cai et al.

(10) Patent No.: US 12,167,430 B2
(45) Date of Patent: *Dec. 10, 2024

(54) CENTRALIZED NETWORK POLICY CONTROLLER AND METHOD FOR OPERATING

(71) Applicant: T-Mobile Innovations LLC, Overland Park, KS (US)

(72) Inventors: Zheng Cai, Fairfax, VA (US); Zheng Fang, McLean, VA (US); David Zhijun Sun, Broadlands, VA (US); Yu Wang, Fairfax, VA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/344,050

(22) Filed: Jun. 29, 2023

(65) Prior Publication Data

US 2023/0345516 A1 Oct. 26, 2023

Related U.S. Application Data

(63) Continuation of application No. 17/184,906, filed on Feb. 25, 2021, now Pat. No. 11,737,122.

(51) Int. Cl.
*H04W 72/53* (2023.01)
*H04L 67/60* (2022.01)
*H04W 28/08* (2023.01)

(52) U.S. Cl.
CPC ......... *H04W 72/53* (2023.01); *H04L 67/60* (2022.05); *H04W 28/0992* (2020.05)

(58) Field of Classification Search
USPC .................................................. 370/259
See application file for complete search history.

(56) References Cited

U.S. PATENT DOCUMENTS

| | | | |
|---|---|---|---|
| 11,737,122 B1* | 8/2023 | Cai .................. | H04W 72/53 |
| | | | 370/259 |
| 2019/0141536 A1* | 5/2019 | Bachmutsky ......... | H04L 67/10 |
| 2019/0230556 A1 | 7/2019 | Lee | |
| 2019/0372837 A1* | 12/2019 | Yang ................... | H04L 41/40 |
| 2020/0084127 A1 | 3/2020 | Shaikh et al. | |
| 2020/0178320 A1 | 6/2020 | Dowlatkhah et al. | |
| 2020/0195521 A1* | 6/2020 | Bogineni ............ | H04W 48/18 |

(Continued)

FOREIGN PATENT DOCUMENTS

| WO | 2019034609 A1 | 2/2019 |
|---|---|---|
| WO | 2020031158 A1 | 2/2020 |

*Primary Examiner* — Jay L Vogel
(74) *Attorney, Agent, or Firm* — Jones Robb, PLLC (57) ABSTRACT

Systems and methods are provided for controlling implementation of network policies in a system including a core network and an open radio access network (O-RAN). The method includes receiving a request for accessing one of multiple network components from an application at a centralized network policy controller. The method additionally includes evaluating the request at the central network policy controller to determine if the request is core related or RAN related and assigning the application to a selected one of the multiple network components based on the evaluation, wherein the selected one is a core component when the request is core-related and the selected one is a RAN component when the request is RAN-related.

20 Claims, 8 Drawing Sheets

(56) References Cited

U.S. PATENT DOCUMENTS

| | | |
|---|---|---|
| 2020/0228608 A1 | 7/2020 | Talebi Fard et al. |
| 2021/0258866 A1* | 8/2021 | Chou .................... H04W 48/16 |
| 2021/0258969 A1* | 8/2021 | Yang .................... H04W 72/54 |
| 2022/0014887 A1* | 1/2022 | Bartolome Rodrigo .................... H04W 4/50 |

* cited by examiner

CENTRALIZED NETWORK POLICY CONTROLLER AND METHOD FOR OPERATING

This patent application is a continuation of U.S. patent application Ser. No. 17/184,906, filed on Feb. 25, 2021, which is incorporated by reference in its entirety for all purposes.

TECHNICAL BACKGROUND

A wireless network, such as a cellular network, can include a core network and a radio access network (RAN) serving multiple wireless devices or user equipment (UE) in a geographical area covered by a radio frequency transmission provided by the access network. As technology has evolved, different carriers within the cellular network may utilize different types of radio access technologies (RATs). RATs can include, for example, third generation (3G) RATs (e.g., WCDMA, UMTS, CDMA etc.), fourth generation (4G) RATs (e.g., WiMax, LTE, etc.), and fifth generation (5G) RATs (new radio (NR)). Further, different types of access nodes may be implemented within the access network for deployment for the various RATs. For example, an eNodeB may be utilized for 4G RATs and a gNodeB may be utilized for 5G RATs. Deployment of the evolving RATs in a network provides numerous benefits. For example, newer RATs may provide additional resources to subscribers, faster communications speeds, and other advantages.

The evolution of 5G RATs has resulted in significant network architectural developments. For example, the 5G core network offers a serviced based architecture (SBA). The 5G core network is delivered through a set of interconnected network functions (NFs). The NFs are able to access the services of the other NFs in the core network. This is in contrast to the 4G LTE evolved packet core, which implemented a fixed-function, hard-wired architecture.

Furthermore, for the RAN, an open RAN (O-RAN) structure has been proposed. The O-RAN includes multiple disaggregated components, such as a RAN Intelligent Controller (RIC), centralized unit (CU), distributed unit (DU), and radio unit (RU). The CU generally is centralized so as to control the operation of several DUs. The DUs are juxtaposed near the RUs and may in some instances be integrated with the RUs, which communicated with UEs. The RIC can be decomposed into a near real time (RT) RIC and a non-RT RIC. Both the near RT RIC and the non-RT RIC can implement policies related to different vendors and DUs and RUs in the O-RAN may be provided by different vendors.

In 5G networks, the core network has a third party application exposure function to trigger application driven optimization. The core network may host core applications or micro services called cAPPs. Further, in the O-RAN environment, there are applications or micro-services (xAPPs) exposed to the third party applications in the near RT RIC and radio applications or micro-services (rAPPs) exposed to the third party applications in the non-RT RIC, which is used by vendors for application triggered QoE execution.

In some instances, conflicting or inconsistent policies may exist within the aforementioned components of the wireless network. For example, the core network may include one set of policies and the near RT RIC and non-RT RIC in the O-RAN may include distinct sets of policies. Policies may relate to performance parameters, such as, for example latency and throughput. Applications running within the network may request access to the network components and the corresponding policies. Delays in the network and policy variances may impact an overall quality of experience (QoE). Currently, the network does not include any component for determining which applications should be routed to which network component and policies for execution. Instead, the applications simply request access to a single component. This process results in inconsistent application of policies.

Accordingly a solution is needed for controlling policy within the network so that applications are directed to an appropriate network component based on their characteristics and the capabilities of the network components.

Overview

Exemplary embodiments include a Centralized Network Policy Controller (CNPC) for controlling implementation of network policies in a network including a core network and an O-RAN. The CNPC includes a processor programmed to perform operations including receiving a request for accessing one of multiple network components from an application at the CNPC. The operations additionally include evaluating the request at the CNPC and assigning the application to one of the multiple network components based on the evaluation.

In a further exemplary embodiment, a method is provided for controlling implementation of network policies in a wireless communication network including a core network and an O-RAN. The method includes receiving a request for accessing one of multiple network components from an application at a CNPC. The method further includes evaluating the request at the CNPC to determine if the request is core related or RAN related and assigning the application to a selected one of the multiple network components, based on the evaluation, wherein the selected one is a core component when the request is core-related and the selected one is a RAN component when the request is RAN-related.

Exemplary embodiments additionally include a wireless network including a core network having core components, an O-RAN access network having RAN components, and a CNPC. The CNPC controls implementation of wireless network policies by performing multiple steps. The steps include receiving a request from an application for accessing one of multiple network components and evaluating the request to determine if the application is core related or RAN related. The steps additionally include assigning the application to a selected one of the core network components and the RAN components based on the evaluation, wherein the selected one is a core component when the application is core-related and the selected one is a RAN component when the application is RAN-related.

Exemplary embodiments may further include determining, when the application is related to the RAN, if the application requires near-real time processing or non-real time processing. When near real-time processing is required, the centralized network policy controller assigns the application to the near-real time controller. When non-real time processing is required, the centralized network policy controller assigns the application to the non-real time controller.

DETAILED DESCRIPTION

Exemplary embodiments described herein include systems, methods, and components for controlling network policy. Embodiments disclosed herein include a CNPC, which assigns different applications to the core network or the RAN based on the application types and architecture requirements. When third party applications request access to a network component, the CNPC determines whether each application is allowed at the requested network component or whether it should be re-directed to a different network component. The determination may be based on the application specific execution requirements as well as the characteristics of the network components.

In particular, exemplary embodiments relate to application triggered policy changes in a service based architecture. The policies may be, for example, UE related or location related. For example, when a UE enters an enterprise, a new enterprise policy may be applied. Due to the multiple vendors participating in the O-RAN architecture, different policies may be desirable. The O-RAN architecture includes a radio intelligent (RIT) controller, made up of a near-real time (RT) RIT controller and a non-RT RIT controller. These components have the capability to make policy changes within O-RAN. However, policy changes may also be required at the core network. Accordingly, embodiments set forth herein provide the CNPC to implement policy changes throughout both the core network and the RAN.

Within the near-RT RIC, for example, a policy could be related to different vendors. Two different distributed units (DU) controlled by the near-RT RIC may be offered by different vendors. In order to make the DUs interoperable, access can be opened so that any kind of RAN function related applications, such as load balancing, traffic related triggering, offloading, or others can be implemented at the near-RT RIC, regardless of whether applications are service level or radio level applications. Similarly, with the non-RT RIC, offloading between two radio units (RUs) or DUs from different vendors may be facilitated. Policies for the non-RT RIC and near-RT RIC could directly, indirectly, or impliedly impact the same parameter associated with the same function. When vendors implement policies that relate to the service level application using the RIC, this could conflict with core policies set in the Policy Control Function (PCF).

In order to control policy within a core network having an SBA architecture and an O-RAN, a CNPC is described herein. For any kind of application related policy or application program interface (API) or related function, the CNPC decides where implementation should be performed. In embodiments set forth herein, the CNPC may include or access a centralized common API platform, to provide a consistent experience for determining at which network entity policies will be implemented. For example, each API may be allocated to specific network component. Upon selecting an appropriate network component for implementing an application, the CNPC moves the application to the network component.

From each network component, registration can be performed in a manner utilized within an SBA to let other components know what services are provided from the selected component. Accordingly, embodiments provided herein provide policy that can be triggered by applications. Service based changes can be implemented in an application specific manner. The CNPC decides an appropriate location in the network for applying policy for each application.

Figure 1:
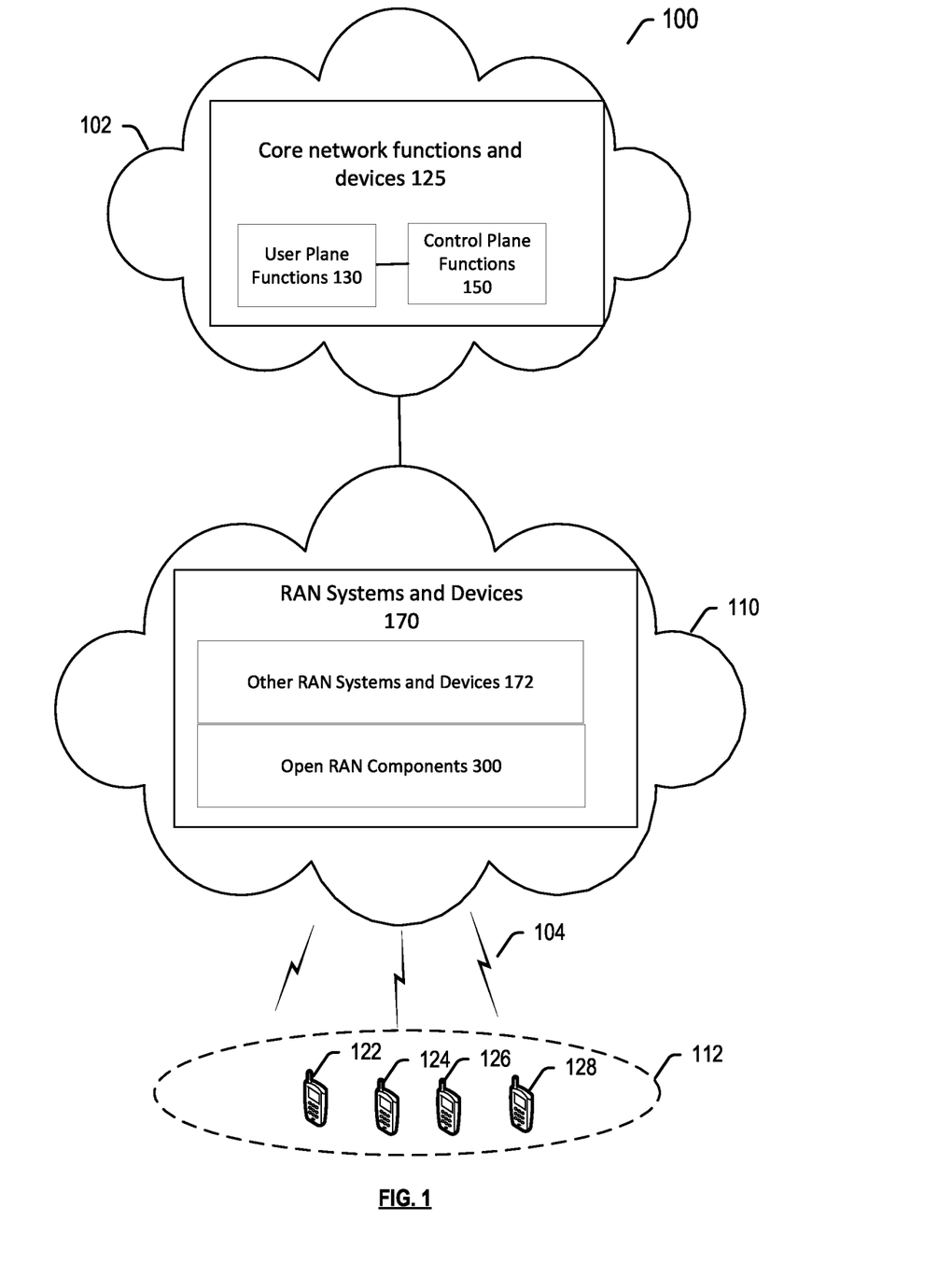
FIG. 1 depicts an exemplary system for wireless communication, in accordance with the disclosed embodiments.

FIG. 1 depicts an exemplary system 100 for wireless communication, in accordance with the disclosed embodiments. The system 100 may include a core network 102, a radio access network (RAN) 110 and multiple wireless devices 122, 124, 126, and 128 able to communicate within the network. The wireless devices 122, 124, 126, and 128 may be end-user wireless devices and may operate within one or more coverage areas 112 and communicate with the RAN 110 over communication links 104, which may for example be 5G NR communication links, 4G LTE communication links, or any other suitable type of communication link.

Figure 2:
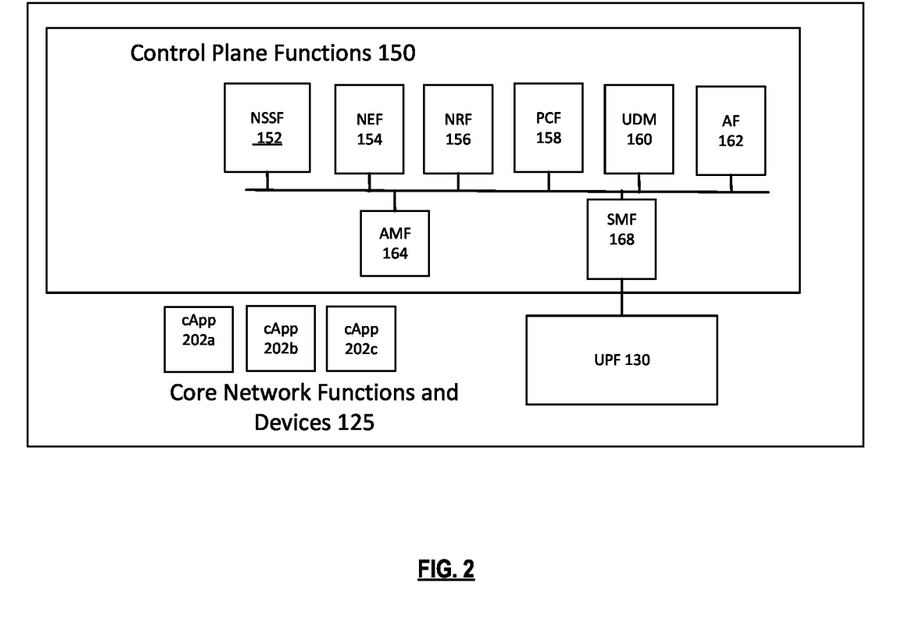
FIG. 2 illustrates an exemplary configuration of core network components and functions in accordance with disclosed embodiments.

The core network 102 includes core network functions and elements 125. As set forth above, the core network may be structured using a service-based architecture (SBA). The network functions 125 may be separated into user plane functions 130 and control plane functions 150. Service-based interfaces may be utilized between control-plane functions, while user-plane functions connect over point-to-point links. FIG. 2, which is further described below, illustrates further details of the core network functions and elements 125.

The RAN 110 may include various access network systems and devices 170, such as O-RAN components 300 and other systems and devices 172. The RAN systems and devices 170 are disposed between the core network 102 and the end-user wireless devices 122, 124, 126, 128. Some of the systems and devices 170 may communicate directly with the core network 102 and others may communicate directly with the end user wireless devices 122, 124, 126, 128. Other systems and devices 172 may communicate with one another within the RAN in order to provide services from the core network 102 to the end-user wireless devices 122, 124, 126, and 128.

The RAN 110 includes at least an access node (or base station), such as an eNodeB, a next generation NodeB (gNodeB) communicating with a plurality of end-user wireless devices. It is understood that the disclosed technology for may also be applied to communication between an end-user wireless device and other network resources, such as relay nodes, controller nodes, antennas, etc. Further, multiple access nodes may be utilized. For example, some wireless devices may communicate with an LTE eNodeB and others may communicate with an NR gNodeB.

Access nodes can be, for example, standard access nodes such as a macro-cell access node, a base transceiver station, a radio base station, an eNodeB device, an enhanced eNodeB device, a next generation NodeB (or gNodeB) in 5G New Radio ("5G NR"), or the like. As will be further described below, access nodes may include combinations of DUs and RUs. In additional embodiments, access nodes may comprise two co-located cells, or antenna/transceiver combinations that are mounted on the same structure. Alternatively, access nodes may comprise a short range, low power, small-cell access node such as a microcell access node, a picocell access node, a femtocell access node, or a home eNodeB device.

Access nodes can be configured to deploy at least two different carriers, each of which utilizes a different RAT. For example, a first carrier may be deployed by an access node in an LTE mode, and a second carrier may be deployed by an access node in an NR mode. Thus, in an embodiment, the access node may comprise two co-located cells, or antenna/transceiver combinations that are mounted on the same structure. In some embodiments, multiple access nodes may be deployed and each access node may support a different RAT. For example, a gNodeB may support NR and an eNodeB may provide LTE coverage. Any other combination of access nodes and carriers deployed therefrom may be evident to those having ordinary skill in the art in light of this disclosure.

The access nodes can comprise a processor and associated circuitry to execute or direct the execution of computer-readable instructions to perform operations such as those further described herein. Access nodes can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof.

The wireless devices 122, 124, 126, and 128 may include any wireless device included in a wireless network. For example, the term "wireless device" may include a relay node, which may communicate with an access node. The term "wireless device" may also include an end-user wireless device, which may communicate with the access node in the access network 110 through the relay node. The term "wireless device" may further include an end-user wireless device that communicates with the access node directly without being relayed by a relay node.

Wireless devices 122, 124, 126, and 128 may be any device, system, combination of devices, or other such communication platform capable of communicating wirelessly with access node 110 using one or more frequency bands and wireless carriers deployed therefrom. Each of wireless devices 122, 124, 126, and 128, may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can send and receive audio or data. The wireless devices may be or include high power wireless devices or standard power wireless devices. Other types of communication platforms are possible.

System 100 may further include many components not specifically shown in FIG. 1 include processing nodes, controller nodes, routers, gateways, and physical and/or wireless data links for communicating signals among various network elements. System 100 may include one or more of a local area network, a wide area network, and an internetwork (including the Internet). Communication network 100 may be capable of communicating signals and carrying data, for example, to support voice, push-to-talk, broadcast video, and data communications by end-user wireless devices 122, 124, 126, and 128. Wireless network protocols may include one or more of Multimedia Broadcast Multicast Services (MBMS), code division multiple access (CDMA) 1xRTT (radio transmission technology), Global System for Mobile communications (GSM), Universal Mobile Telecommunications System (UMTS), High-Speed Packet Access (HSPA), Evolution Data Optimized (EV-DO), Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G, 5G New Radio ("5G NR"), or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). System 100 may include additional base stations, controller nodes, telephony switches, internet routers, network gateways, computer systems, communication links, or other type of communication equipment, and combinations thereof.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between the access network 110 and the core network 102.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication system 100 may be, comprise, or include computers systems and/or processing nodes, including access nodes, controller nodes, and gateway nodes described herein.

The operations for centralized network policy control may be implemented as computer-readable instructions or methods, and processing nodes on the network for executing the instructions or methods. The processing node may include a processor included in the access node or a processor included in any controller node in the wireless network that is coupled to the access node.

FIG. 2 illustrates an exemplary configuration of core network functions and elements 125 in accordance with disclosed embodiments. The functions and elements 125 may include control plane functions 150 and user plane functions 130. The control plane functions 150 may include, for example a Network Slice Selection Function (NSSF) 152, a Network Exposure Function (NEF) 154, a Network Repository Function (NRF) 156, a Policy Control Function (158), a Unified Data Management (UDM) function 160, an Application Function (AF) 162, an Access and Mobility Function (AMF) and a Session Management Function (SMF) 168. Additional or fewer control plane functions 150 may also be included. Control plane functions can provide one or more NF based on a request-response or subscribe-notify model. The core network functions and elements 125 as illustrated form a micro services based architecture, which may include network functions distributed over different cloud infrastructures. Additionally many services may span different network functions and domains that work in unison.

The user plane function (UPF) 130 performs operations such as, packet routing and forwarding, packet inspection, policy enforcement for the user plane, QoS handling, etc. When compared with 4G EPC, the functions of the UPF 130 resemble those of the SGW-U (Serving Gateway User Plane function) and PGW-U (PDN Gateway User Plane function).

The NRF 156, which is a control plane function, maintains the list of available network functions and their profiles. It also performs services registration and discovery so that different network functions can find each other. As an example, the SMF 168 which is registered to NRF 156 becomes discoverable by the AMF 164 when a UE or other device tries to access a service type served by the SMF 168. The NRF 156 broadcasts available services once they are registered in the 5G core. To use other network functions, registered function can send service requests to the NRF 156.

The core network functions 125 may additionally include a plurality of core micro-services core applications (cAPPs). These cAPPs may be stored in the core network 102 or be accessible from the core network 102. Other core functions and elements 125 may also be included as would be known to one skilled in the art.

Figure 3:
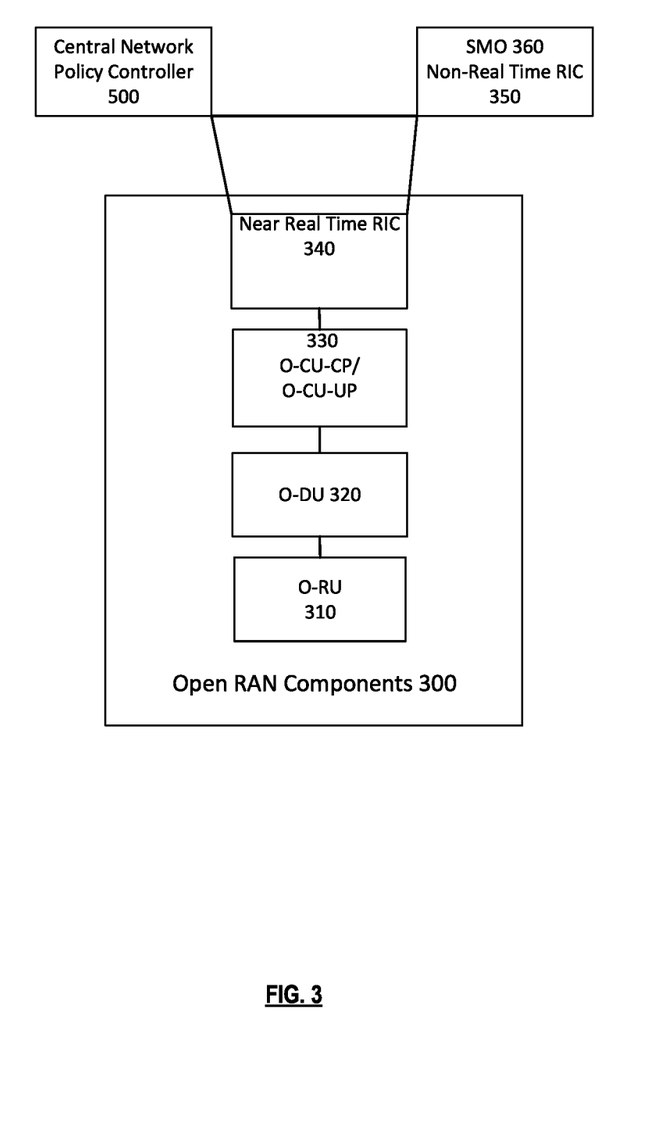
FIG. 3 is a block diagram illustrating O-RAN components in accordance with the disclosed embodiments.

FIG. 3 is a block diagram illustrating interaction of a CNPC 500 and Service Management Orchestration (SMO) layer 360 with O-RAN components 300 in accordance with the disclosed embodiments. O-RAN components 300 include multiple software components interacting with Radio Units (RUs) 310. These include Distributed Units DUs 320, Central Units (CU) 330, and the RIC architecture composed of RAN intelligent Controller (RIC) including a near-RT RIC 340 and a non-RT RIC 350. While the near-RT RIC 340 is located within the RAN 170, the non-RT RIC 350 is located within the SMO 360 which may be within a central office. These components may all be deployed as Virtual Network Functions (VNFs) or containers to distribute capacity across multiple network elements. The interaction of these components mikes the RUs 310, DUs 320 and CU 330 run more efficiently to deliver a better network experience to end users.

The CNPC 500 may interact with these components as well as core network components in order to assign applications to network components. The CNPC 500 may be located within a central office. It may also be a VNF and may and may operate within a processing node such as that shown in FIG. 5 and be shared between the O-RAN and the core network. The CNPC 500 may determine which policies to assign to which network component because different policies with respect to parameters such as resource allocation, load balancing, interference reduction, throughput, latency, quality of service (QoS) etc. may exist throughout the network. The CNPC 500 may make the determinations of which policies apply to which components based on stored network knowledge and characteristics of the components.

The RU 310 may be a radio unit that handles the digital front end (DFE) and the parts of the physical (PHY) layer and digital beamforming functionality. The DU 320 is a distributed unit that sits close to the RU 310. In embodiments, the DU 320 runs the Radio Link Control (RLC), Media Access Control (MAC) layer, and parts of the PHY layer. This DU 320 may also include a subset of the eNB/gNB functions and its operation may be controlled by the CU 330.

The CU 330 is the centralized unit that runs the Radio Resource Control (RRC) and Packet Data Convergence Protocol (PDCP) layers. An access node, such as a gNB may include a CU 330 and one DU 320 connected to the CU 330 by different interfaces for the control plane and user plane. In some instances, CU 330 may interface with multiple DUs 320 to support multiple gNBs. The split architecture enables a 5G network to utilize different distribution of protocol stacks between CU and DUs depending on mid-haul availability and network design. The CU 330 is a logical node that includes the gNB functions like transfer of user data, mobility control, RAN sharing, positioning, etc. The CU 330 may control the operation of several DUs 320 over the mid-haul interface.

The Near-RT RIC 340 may support tasks involving a low latency, such as, for example, a latency of less than one second. The Near-RT RIC includes a micro-service-based software platform for hosting micro-service-based applications called xAPPs. The xAPPs run on the near-RT RIC 340 and provide for RAN management and optimization. The near-RT RIC software platform may provide xAPPs in a cloud-based infrastructure for controlling a distributed collection of RAN infrastructure (eNB, gNB, CU, DU) via an interface. The Near-RT RIC 340 also provides another interface for operators to the Non-RT RIC 350 for the management and optimization of the RAN. The xAPPs may collect near real-time information within the network on a UE basis or a cell basis.

The non-RT RIC 350 supports tasks that allow longer latency than the near-RT RIC 340. The non-RT RIC 350 may for example, support tasks that allow a latency of one second or greater. The non-RT RIC 350 has functions including service and policy management, RAN analytics and model-training for the Near-RT RIC. The non-RT RIC 350 is placed inside the SMO layer so that it can access external information to dynamically use policies to optimize the RAN powered by Artificial Intelligence (AI) and Machine Learning (ML). The SMO layer 360 may be shared by the core network 102 and the RAN 110. The non-RT RIC 350 participates in SMO hosting of applications acting across RAN and core to generate and apply new policies and network optimizations.

The non-RT RIC 350 hosts rAPPs, which are microservices for various management tasks such as assurance, optimization, automation, de-ice management fault management, performance management, configuration management, software management, domain-specific applications, and lifecycle management for all elements in the network. The non-RT RIC 350 may provide similar functionality to Element Management (EMS) and in legacy networks. The non-RT RIC 350 may automatically configure new RUs, thus reducing the need for manual intervention. The non-RT RIC 350 supports RAN optimization by providing information to the near-RT RIC 340. The non-RT RIC 350 also leverages the SMO services to collect data such as network and subscriber data, big data, counters, network statistics, and failure: information and use data analytics and AI/ML training to facilitate RAN optimization. The non-RT RIC distributes its trained models to the Near-RT RIC 340 for run e execution.

In summary, the non-RT RIC 350 is responsible for machine learning (ML), artificial intelligence (AI), modeling and data crunching and provides configuration management and analytics functionality. The non-RT RIC 350 feeds data collected from RAN elements into near-RT RIC 340 and provides element management and reporting. The near-RT RIC 340 is responsible for creating a software platform for a set of xAPPs for RAN management and optimization. The near-RT RIC 340 has functionality for making optimization decisions for the multi-vendor O-RAN, These functions work together to facilitate the O-RAN.

Processing in the O-RAN 300 flows from the non-RT RIC 350 to the near RT RIC 340. The near RT-RIC 340 communicates with the CUs 330, which communicate with DUs 320, which communicates with the RUs 310. The CUs 330, DUs 320 and RUs 310 execute applications and perform policy changes.

Figure 4:
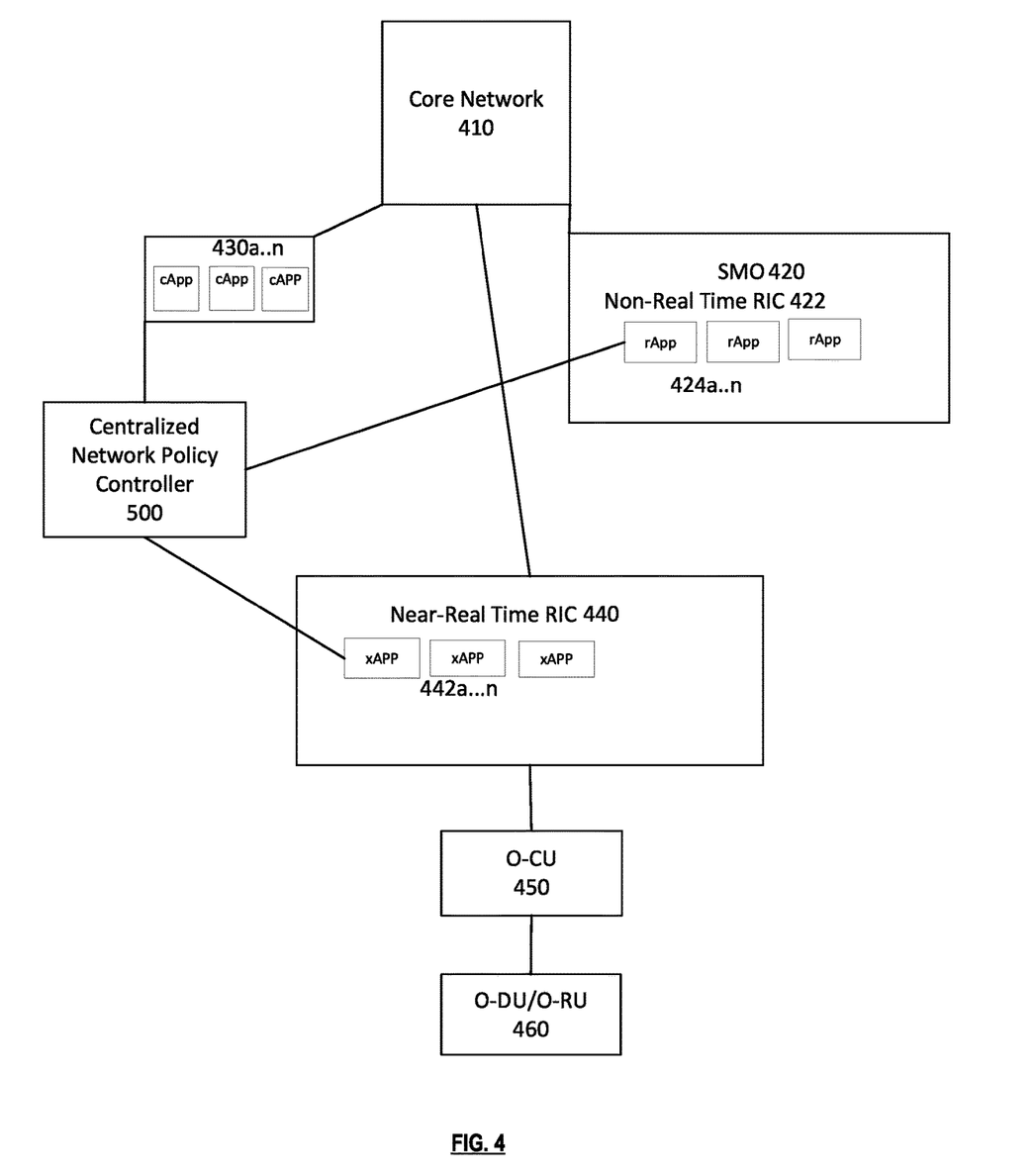
FIG. 4 is a flow diagram depicting flow between core network components and the O-RAN in accordance with disclosed embodiments.

FIG. 4 is a flow diagram depicting flow between core network components 410 and the O-RAN components including the CNPC 500 in accordance with disclosed embodiments. As explained above, the CNPC 500 may be operate as a VNF and may be located in the core network, the RAN, or may be shared between the core network and the RAN. The CNPC 500 communicates with O-RAN components including a non-RT RIC 422 located within an SMO function 420 and a near-RT RIC 440. The non-RT RIC hosts multiple rAPPs 424*a* . . . *n* and the near RT RIC hosts multiple xAPPs 442*a* . . . *n*. The CNPC 500 also communicates with a core network 410 hosting cAPPs 430*a* . . . *n*. The xAPPs 442*a* . . . *n*, rAPPs 424*a* . . . *n*, and cAPPS 430*a* . . . *n* may store or implement policies related to network quality of service, such as latency, throughput, and routing policies. In embodiments provided herein, the CNPC 500 may assign policies to the core network 410, the non-RT RIC 422 and the near RT RIC 440. The policy assignment may be based on stored network information and the characteristics of the network components. For example, the core and O-RAN components may implement different policies with respect to routing, latency, throughput, and other QoS parameters. The CN PC 500 assigns applications to network components storing these policies as will be further described below.

Figure 5:
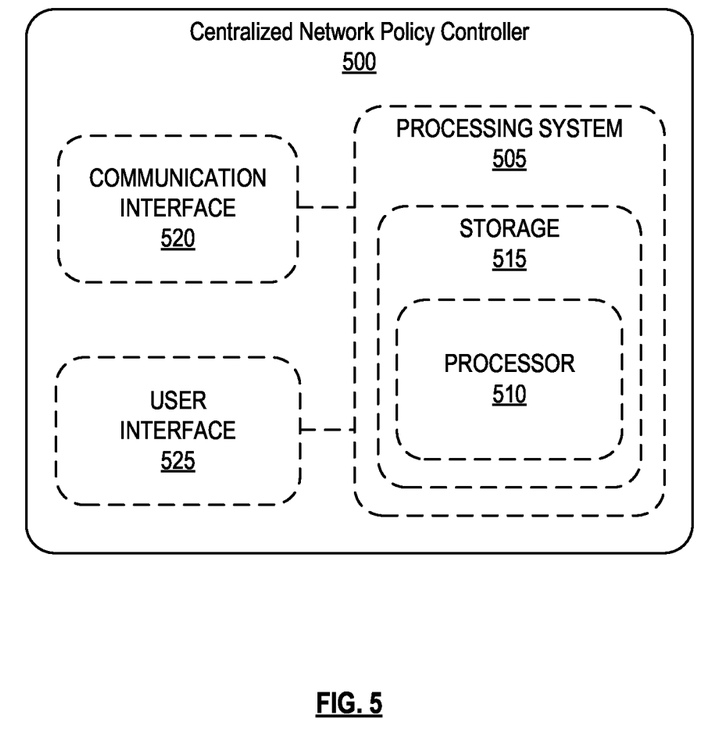
FIG. 5 depicts an exemplary configuration for a centralized network policy controller in accordance with the disclosed embodiments.

FIG. 5 depicts an exemplary CNPC 500, which may be configured to perform the methods and operations disclosed herein to provide centralized control of network policy in a wireless network. In some embodiments, CNPC 500 may be included in the core network 102. In further embodiments, CNPC 500 may be included in the access network 110 or O-RAN 300.

CNPC 500 may be configured for assigning applications to network components within the core network 102 and the access network 110. CNPC 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing various operations described herein. Processor 510 may be a microprocessor and may include hardware circuitry and/or embedded codes configured to retrieve and execute software stored in storage device 515.

CNPC 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to CNPC 500 and receive data or information from CNPC 500. User interface 525 may include hardware components, such as touch screens, buttons, displays, speakers, etc. CNPC 500 may further include other components such as a power management unit, a control interface unit, etc.

Figure 6:
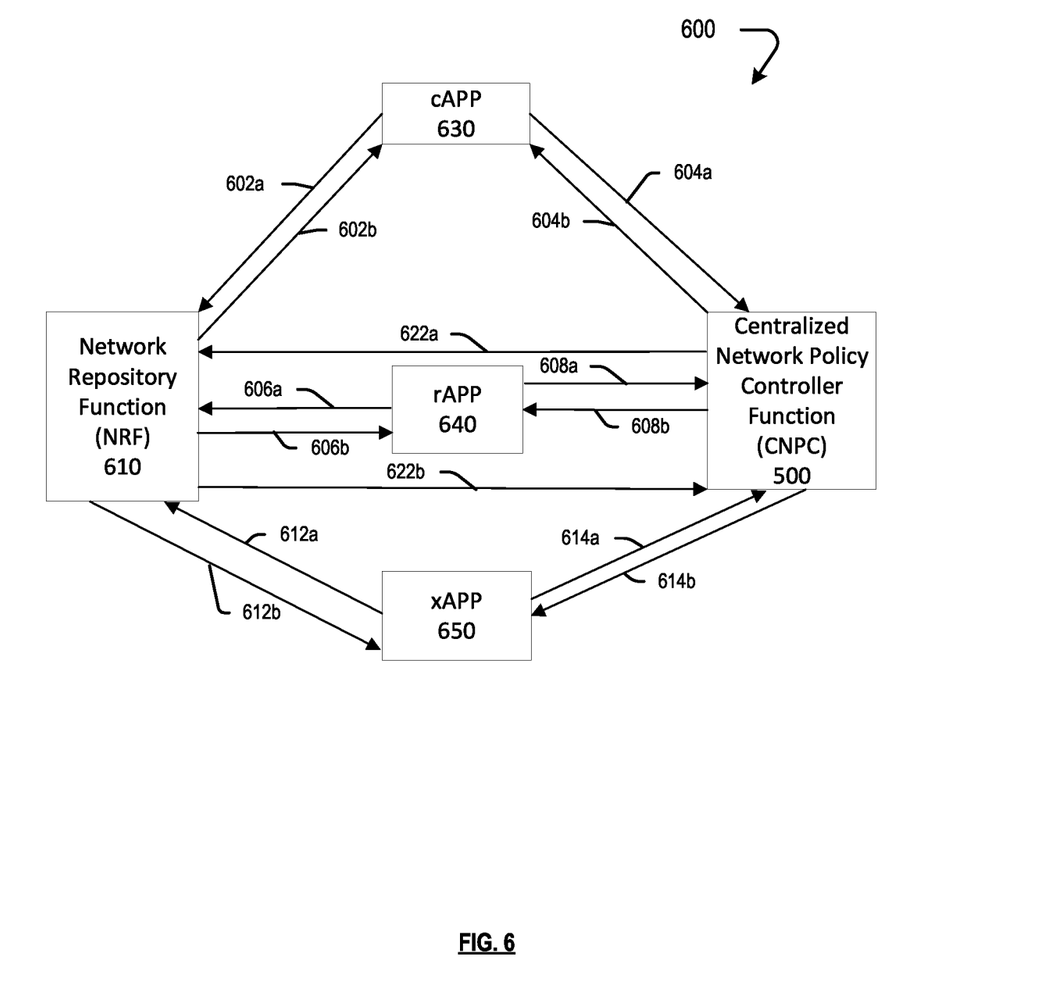
FIG. 6 is a flow diagram illustrating flow between network components in accordance with disclosed embodiments.

FIG. 6 is a flow diagram illustrating flow between network components in accordance with disclosed embodiments. More specifically, FIG. 6 illustrates an NRF 610 communicating with cAPPs 630, rAPPs 640, xAPPs 650 and a CNPC 500.

The NRF 610 maintains an updated repository of the network components along with services provided by each of the elements in the core network. The NRF 610 additionally provides a discovery mechanism that allows the elements to discover each other. The NRF 610 provides a registration function that allows each network function to register a profile and a list of services with the NRF. Thus, as illustrated, cAPPs 630 may send a registration request 602*a* to the NRF 610 and receive in return an acceptance 602*b* from the NRF 610. Through this process, the profile of the cAPPs 630 and the services of the cAPPs 630 will be registered with the NRF 610. Similarly, the rAPPs send a registration request 606*a* to the NRF 610 and receive a registration acceptance 606*b* and the xAPPs 650 send a registration request 612*a* to the NRF 610 and receive a registration acceptance 612*b*. As a newly introduced component, the CNPC 500 also sends a registration request 622*a* to the NRF 610 and receives a registration acceptance 622*b* upon having its profile and services stored in the NRF 610. Furthermore, should any of the aforementioned components require updating, the components may forward an update request similar to the registration request to the NRF 610.

The CNPC 500 provides a subscription service for those network functions registered with the NRF 610. By providing the subscription service, the CNPC 500 provides its services to the registered components. Once network services or functions subscribe the CNPC 500, the CNPC 500 functions to assign applications to the appropriate network functions or components. As illustrated, the cAPP 630, rAPPs 640, and xAPPs 650 send subscription requests 604*a*, 608*a*, and 614*a* to the CNPC 500. The CNPC 500 accepts the subscription requests of the cAPPs at 604*b*, of the rAPPs at 608*b*, and of the xAPPs at 614*b*. Accordingly, the CNPC 500 becomes aware of services offered in the core network and in the RIC controller of the O-RAN in accordance with embodiments set forth herein.

Figure 7:
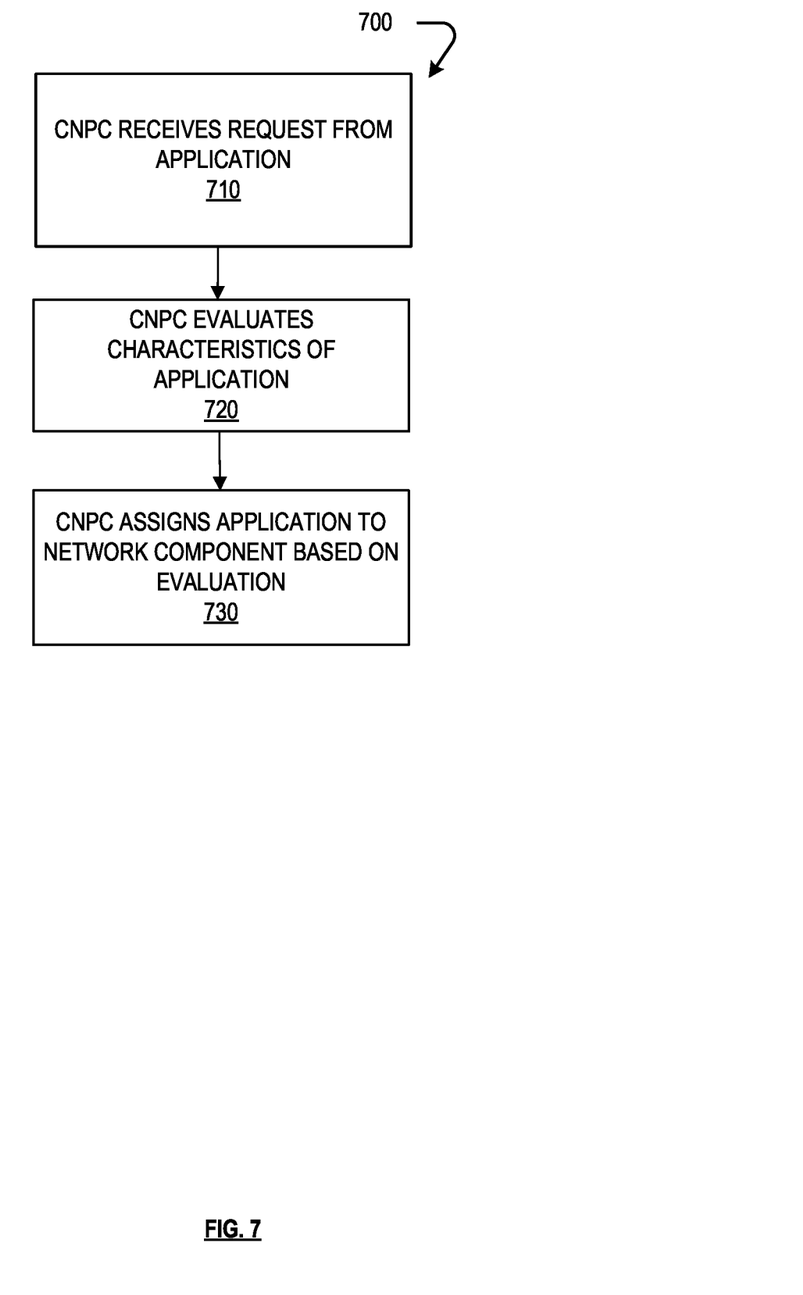
FIG. 7 is a flow chart depicting an exemplary method for operating the CNPC in accordance with disclosed embodiments.

The disclosed methods for operating the CNPC are further described below. FIG. 7 is a flow chart depicting an exemplary method 700 for operating the CNPC 500 in accordance with disclosed embodiments. Method 700 may be performed by any suitable processor discussed herein included in the CNPC 500. For example, the processor may be or include the processor 510 shown in FIG. 5 as being incorporated in the CNPC 500. In step 710, the CNPC 500 receives a request from an application. For example, the request may be UE related and location related and the CNPC 500 may receive the request when a UE moves to a specific location. In step 720, the CNPC evaluates the characteristics of the application. For example, when a UE enters an enterprise, a new enterprise policy may be applied. In step 730, the CNPC 500 assigns the application to a network component, for example, in the core network or the O-RAN based on the characteristics of the application. Thus, the CNPC 500 make changes to policies associated with application.

Figure 8:
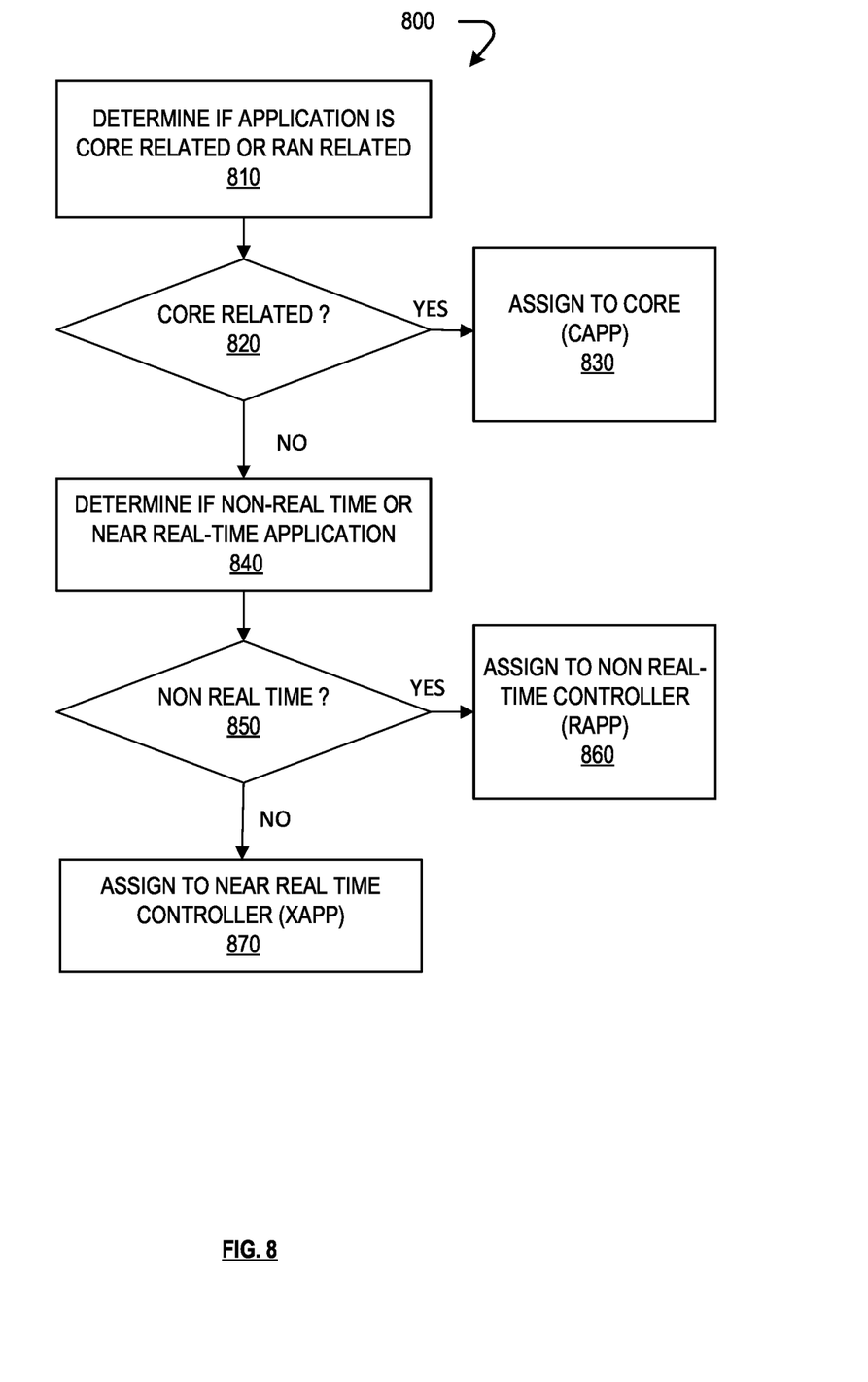
FIG. 8 is a flow chart depicting a further exemplary embodiments for operating the CNPC.

FIG. 8 is a flow chart depicting a further exemplary method 800 for operating the CNPC 500. Method 800 may be performed by any suitable processor, for example, the processor 510 of the CNPC 500 as shown in FIG. 5. Specifically, FIG. 8 illustrates assignment of an application to a component of the network based on the characteristics of the application. In step 810, the CNPC 500 determines if the application is core related or RAN related. If the CNPC 500 determines that the application is core related in step 820, the CNPC 500 assigns the application to the core in step 830, where cAPPs provide services. For example, less time critical applications may be assigned to the core network. To accomplish the evaluation of the application to determine if it is core related, characteristics of the application may be evaluated. For example, a predetermined time threshold for execution may be set. Thus, if an application does not need to execute within a predetermined time threshold, for example, 2 seconds, then the application may be deemed core related. Thus, if the target execution time meets the predetermined time threshold, the CNPC 500 may assign the application to the core network. Other evaluation criteria may alternatively or additionally be considered. The other evaluation criteria may include, for example, an application type or architecture requirement of the application.

However, if the application is time critical or is not core related in step 820, the CNPC 500 determines in step 840 if the application should be executed in real time or non-real time. If the CNPC 500 determines that non-real time execution is appropriate in step 850, the CNPC 500 assigns the application to the non-RT RIC, where rAPPs are provided in step 860. However, if the application is time critical and should be executed in real time, the CNPC 500 assigns the application to the near-RT RIC, where xAPPs are provided in step 870. Through this process, the CNPC 500 assigns applications to network components based on the characteristics of the applications and the network components. In order to determine if the application should be assigned to the near RT or non RT RIC, a second time threshold may be set, for example, 1 second. If the application execution time can be one second or longer, the application can be assigned to the non RT RIC. Thus, when the required or target execution time meets the second threshold, the application may be assigned to the non RT RIC. Otherwise, for faster execution when the threshold is not met, the application may be assigned to the near RT RIC. Other evaluation criteria may alternatively or additionally be considered. The other evaluation criteria may include, for example, an application type or architecture requirement of the application.

In operation, when UEs move to a specific tracking area, policy changes can be made and can be implemented at the core network or the RAN. Once UEs move to a tracking area of the communication network, an event may be triggered for the CNPC 500. If the CNPC 500 assigns an application to the core network, the AF component may contact the PCF to implement a policy change. The PCF may communicate with the SMF, which will connect with the AMF. The AMF communicates with the RAN, where policy changes are implemented.

If the CNPC 500 assigns the application to the O-RAN, for example, in more time critical applications, the assignment is to the non-RT RIC or the near-RT RIC. The near RT RIC will be utilized in the most time critical applications. For example, a drone application performing real time reconnaissance or surveillance may be implemented at the near RT-RIC and will not be assigned to the core network. The policy of the near RT-RIC may communicate with the DU, which will ensure appropriate resources are allocated. Thus, in the instance of more time critical applications, the policy comes from the xAPPs of the near RT RIC.

Accordingly, embodiments of the CNPC as set forth herein solve problems related to inconsistent and inappropriate network policies being utilized. Applications have access more quickly to the near RT RIC and will not be returned to the core network when time critical applications are executed. Through implementation of the CNPC 500, applications have the ability to access any of the components and establish policies accessed through xAPPs, rAPPs, or cAPPs as appropriate for the application. Policies may relate to data throughput, latency, routing, QoS, etc.

In some embodiments, methods 700 and 800 may include additional steps or operations. Furthermore, the methods may include steps shown in each of the other methods. As one of ordinary skill in the art would understand, the methods 700 and 800 may be integrated in any useful manner and the steps may be performed in any useful sequency.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   receiving a first request from a first application and a second request from a second application at a centralized network policy controller registered with a network repository function of a core network having core components, the first and second requests for accessing one of multiple network components including the core components or open radio access network (O-RAN) components;
   evaluating the first and second requests at the central network policy controller to determine a first target execution time for executing the first application and to determine a second target execution time for executing the second application;

comparing the first target execution time and the second target execution time to a first predetermined threshold;
assigning, by the centralized network policy controller, the first application and the second application to one of the multiple network components based on the comparison by assigning the first application making the first request to the core components based on the first target execution time meeting the first predetermined threshold and assigning the second application making the second request to the O-RAN components based on the second target execution time not meeting the first predetermined threshold;
comparing the second target execution time to a second predetermined threshold; and
assigning the second application making the second request to one of a non real-time radio intelligent controller and a near real-time controller of the O-RAN based on the comparison of the second target execution time with the second predetermined threshold.

2. The method of claim 1, further comprising comparing the second target execution time to the second predetermined threshold based on the second target execution time failing to meet the first predetermined threshold.

3. The method of claim 2, further comprising assigning the second application to the non real-time radio intelligent controller of the O-RAN based on the second target execution time meeting the second predetermined threshold.

4. The method of claim 2, further comprising assigning the second application to the near real time controller of the O-RAN based on the second target execution time failing to meet the second predetermined threshold.

5. The method of claim 1, further comprising registering the centralized network policy controller with a network repository function of the core network.

6. The method of claim 1, wherein the multiple network components comprise at least two RAN components including the near real time controller and the non-real time controller.

7. The method of claim 1, wherein evaluating the first and second requests comprises evaluating a type of the application and an architecture requirement.

8. The method of claim 1, further comprising executing the first application and the second application in accordance with predetermined policies of the assigned network component.

9. The method of claim 8, wherein the predetermined policies are related to at least one of resource allocation, throughput, latency, quality of service, load balancing, and interference reduction.

10. A wireless network comprising:
a core network having core components;
an O-RAN access network having multiple O-RAN components; and
a centralized network policy controller for controlling implementation of wireless network polices, the centralized network policy controller performing operations including:
receiving a first request from a first application and a second request from a second application, the first and second requests for accessing one of multiple network components;
evaluating the first and second requests at the centralized network policy controller to determine a first target execution time for executing the first application and to determine a second target execution time for executing the second application;
comparing the first target execution time and the second target execution time to a first predetermined threshold;
assigning the first application and the second application to one of the multiple network components based on the comparison by assigning the first application to the core components based on the first target execution time meeting the first predetermined threshold and assigning the second application to the O-RAN based on the second target execution time not meeting the first predetermined threshold;
comparing the second target execution time to a second predetermined threshold; and
assigning the second application making the second request to one of a non real-time radio intelligent controller and a near real-time controller of the O-RAN based on the comparison of the second target execution time with the second predetermined threshold.

11. The wireless network of claim 10, the operations further comprising comparing the second target execution time to a second predetermined threshold based on the second target execution time failing to does meet the first predetermined threshold.

12. The wireless network of claim 11, the operations further comprising assigning the second application to a non real-time radio intelligent controller of the O-RAN based upon the second target execution time meeting the second predetermined threshold.

13. The wireless network of claim 11, the operations further comprising assigning the second application to a near real time controller of the O-RAN based upon the target execution time failing to meet the second predetermined threshold.

14. The wireless network of claim 10, the operations further comprising registering the centralized network policy controller with a network repository function of the core network.

15. The wireless network of claim 10, wherein the multiple network components comprise at least two RAN components including the near real time controller and the non-real time controller.

16. The wireless network of claim 10, wherein the core network comprises a network repository function and the centralized network policy controller further performs the step of registering with the network repository function of the core network.

17. The wireless network of claim 10, wherein evaluating the first request and the second request comprises evaluating a type of the application and an architecture requirement.

18. The wireless network of claim 10, wherein the core network comprises a 5G service based architecture.

19. A centralized network policy controller for controlling implementation of network policies in a network including a core network having core components and an open radio access network (O-RAN), the centralized network policy controller comprising:
a processor programmed to perform operations including,
receiving a first request from a first application and a second request from a second application, the first and second requests for accessing one of multiple network components;
evaluating the first and second requests at the central network policy controller to determine a first target execution time for executing the first application and to determine a second target execution time for executing the second application;
comparing the first target execution time and the second target execution time to a first predetermined threshold;

assigning the first application and the second application to one of the O-RAN and the core components based on the comparison by assigning the first application making the first request to the core components based on the first target execution time meeting the first predetermined threshold and assigning the second application making the second request to the O-RAN based on the second target execution time not meeting the first predetermined threshold;

comparing the second target execution time to a second predetermined threshold; and assigning the second application making the second request to one of a non real-time radio intelligent controller and a near real-time controller of the O-RAN based on the comparison of the second target execution time with the second predetermined threshold.

20. The centralized network policy controller of claim 19, the operations further comprising comparing the second target execution time to the second predetermined threshold based on the second target execution time failing to meet the first predetermined threshold;

assigning the second application to the non real-time radio intelligent controller of the O-RAN based on the second target execution time meeting the second predetermined threshold; and assigning the second application to the near real time controller of the O-RAN based on the second target execution time failing to meet the second predetermined threshold.

* * * * *